(12) United States Patent
Baker

(10) Patent No.: US 12,188,419 B1
(45) Date of Patent: Jan. 7, 2025

(54) MANIFOLD SELECT METERING SYSTEM

(71) Applicant: Woodward, Inc., Fort Collins, CO (US)

(72) Inventor: Carthel C. Baker, Daytona Beach, FL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 18/454,613

(22) Filed: Aug. 23, 2023

(51) Int. Cl.
*F02C 9/26* (2006.01)
*F02C 7/22* (2006.01)

(52) U.S. Cl.
CPC ........... *F02C 9/263* (2013.01); *F02C 7/22* (2013.01); *F02C 9/26* (2013.01)

(58) Field of Classification Search
CPC .. F02C 7/22; F02C 7/222; F02C 7/228; F02C 7/232; F02C 9/26; F02C 9/263; F02C 9/32; F02C 9/34; F15B 13/044; F23R 3/34
See application file for complete search history.

(56) References Cited

U.S. PATENT DOCUMENTS

| | | | |
|---|---|---|---|
| 6,487,847 B1* | 12/2002 | Snow | F02K 3/10 60/764 |
| 7,096,658 B2 | 8/2006 | Wernberg et al. | |
| 7,185,485 B2* | 3/2007 | Lewis | F02C 9/263 60/764 |
| 7,565,793 B2* | 7/2009 | Shelby | F02C 7/236 60/734 |
| 7,584,602 B2* | 9/2009 | Lewis | F02C 9/263 60/764 |
| 7,587,900 B2* | 9/2009 | Shelby | F02C 9/263 60/773 |
| 11,781,484 B2* | 10/2023 | Cocks | F02C 9/28 60/772 |
| 11,788,476 B1* | 10/2023 | Rowan | F02C 9/263 60/39.281 |
| 2010/0010721 A1 | 1/2010 | Van Vactor et al. | |
| 2014/0196459 A1 | 7/2014 | Futa et al. | |
| 2015/0020889 A1* | 1/2015 | Baker | F02C 9/263 137/12 |

(Continued)

FOREIGN PATENT DOCUMENTS

EP         2744996 B1         3/2020

*Primary Examiner* — Alain Chau
*Assistant Examiner* — Henry Ng
(74) *Attorney, Agent, or Firm* — Reinhart Boerner Van Deuren P.C.

(57) ABSTRACT

A system and method of providing prime reliability of a primary fuel manifold upon failure of a primary fuel metering system by providing metered fuel from a secondary fuel metering system are provided. The system utilizes a transfer electro-hydraulic servo valve (EHSV), a discharge select valve (DSV) coupled to the EHSV, and a pair of throttling valves positioned between secondary fuel metering system and the primary and secondary fuel manifolds. The DSV has a multi-land piston that switches a control pressure and a shutoff pressure between the pair of throttling valves to transfer the supply of metered fuel of the secondary fuel metering system from the secondary fuel manifold to the primary fuel manifold. The output pressurizing valve of the failed primary fuel metering system is also closed to isolate the failed primary fuel metering system from the primary fuel manifold.

19 Claims, 6 Drawing Sheets

(56) References Cited

U.S. PATENT DOCUMENTS

| | | | |
|---|---|---|---|
| 2016/0195020 A1* | 7/2016 | Bernard | F23K 5/04 |
| | | | 60/776 |
| 2018/0135529 A1* | 5/2018 | Portolese | F02C 9/263 |
| 2021/0277834 A1* | 9/2021 | Culwick | F02C 7/222 |
| 2023/0417193 A1* | 12/2023 | Baker | F02C 7/232 |

\* cited by examiner

MANIFOLD SELECT METERING SYSTEM

FIELD OF THE INVENTION

This invention generally relates to multi-stage gas turbine fuel systems and more particularly to a manifold switching and selection system for a multi-stage gas turbine fuel system that provides redundant supply of fuel to ensure continued primary combustor operation in the event of primary fuel control failure.

BACKGROUND OF THE INVENTION

A typical multi-stage gas turbine fuel system, such as that described in U.S. Pat. No. 7,096,658 to Wernberg et al., entitled Centrifugal Pump Fuel System and Method for Gas Turbine Engine (hereinafter the "'658 Patent"), and assigned to the assignee of the present application, the teachings and disclosure of which are incorporated herein in their entireties by reference thereto, utilizes a single Fuel Metering Unit (FMU) to meter fuel flow downstream to the main combustor stage as needed, e.g., to power an aircraft. The FMU typically includes a single prime reliable fuel metering valve (FMV). This FMV may include a dual channel linear variable displacement transducer (LVDT) to provide feedback of the fuel metering valve position. The Full Authority Digital Electronic Controller (FADEC) uses the position of the FMV to regulate the metered fuel flow. The FADEC positions the FMV by supplying an electrical signal to the Electro-Hydraulic Servo Valve (EHSV) that provide the hydraulic muscle to adjust the FMV to the desired position.

In order to increase the redundancy of the fuel control for applications such as that described in the '658 Patent, and in view of the increasing criticality of the main combustor stage in such and other applications, main fuel metering systems 101 utilize redundant EHSVs 103,105 for control of the FMV 107 of the FMU as shown in FIG. 1. In order to provide such redundancy, a transfer system including a transfer valve 109 is included to allow the FADEC to select which of the two redundant EHSVs 103, 105 to use to control the FMV 107. In the event of a failure of the controlling EHSV 103, the FADEC can signal the transfer system to switch control via the transfer valve 107 to the second EHSV 105, thus maintaining control of the FMV 107.

As described in the '658 Patent, such multi-stage systems also include additional combustor stages, each of which include a similar fuel control system 111. In the exemplary embodiment described in the '658 Patent, such additional combustor stages may include afterburner zones, each of which utilizes an afterburner or secondary fuel control system 111 to provide metered flow to each secondary zone. While only a single additional, secondary stage fuel control system 111 is shown in FIG. 1, additional secondary combustor stages may utilize additional fuel control systems.

This secondary fuel metering system 111 includes a single FMV 113 and a dual channel LVDT to provide feedback of the FMV position. The FADEC uses the position of the FMV 113 to regulate metered fuel flow to each secondary zone. As with the primary combustor stage fuel control 101, the FADEC positions each FMV 113 by supplying an electrical signal to an EHSV 115 that provides the hydraulic muscle to adjust the FMV 113 to the desired position. Unlike the main combustor stage which has evolved to include redundant EHSV control, these additional combustor stages are typically as critical, and therefore do not justify the increased cost and weight of such redundant control components.

While FIG. 1 illustrates the normal operating mode of this prior fuel metering system with the redundant EHSVs 103, 105, FIG. 2 illustrates the operation in the event of a failure of the controlling EHSV 103. In FIG. 1 the transfer system, which utilizes a transfer valve 109 (see also FIG. 5), is positioned such that the control pressures from the main channel A EHSV 103 are supplied via the solid line 117, 119 to position the main FMV 107. The control pressures from the main channel B EHSV 105 shown as the dashed line 121 are blocked from the main FMV 107 at the transfer valve 109. Control of the additional combustor stage metering system EHSV 115 is not linked to the main metering system even though it is in a parallel fluid circuit (or separate fluid circuit in some embodiments).

In FIG. 2 the transfer system is positioned such that the control pressures from the main channel B EHSV 105 are supplied via the solid line 121, 119 to position the main FMV 107. The control pressures from the main channel A EHSV 103 now shown as the dashed line 117 are blocked from the main FMV 107 at the transfer valve 109. This switching of the controlling EHSV represents a failure of the main channel A EHSV 103. Control of the secondary metering system EHSV 115 is not linked to the main metering system and is therefore unaffected by the failure and switching of the metering control in the main combustor stage.

As will be apparent from the foregoing, the provision of the redundant EHSVs 103, 105 to maintain operation and control of the critical main combustor stage FMV 107 in the event of failure of the controlling EHSV 103 results in the use of three EHSVs 103, 105, 115 to control two combustor stages. Unfortunately, such redundancy for the main combustor stage comes at the expense of added weight and cost. For embodiments deployed on aircraft, such additional weight brings its own additional cost besides the componentry cost due to increased fuel burn.

To address these issues, co-pending application Ser. No. 18/340,508, filed Jun. 23, 2023, and entitled REDUNDANT ELECTRO-HYDRAULIC SERVO VALVE (EHSV) CONTROL IN A FUEL METERING SYSTEM, ("the '508 application") which claims the benefit of U.S. Provisional Patent Application No. 63/355,841, filed Jun. 27, 2022, and assigned to the assignee of the instant application, the teachings and disclosure of both applications are hereby incorporated herein in their entireties by reference thereto, provides a fuel control system for multi-stage combustors that provides redundant FMV EHSVs to ensure prime reliability of the main combustor metering system, but that does not add undesirable cost, weight, size, and complexity to the engine. Embodiments of the invention described therein provide such a system that eliminates the dedicated redundant EHSV, and hardware related to the connectors, harness, and FADEC are minimized.

While providing significant advantages over prior systems when the failure is in the controlling EHSV, in other situations wherein a failure more broadly affects the main combustor metering system, a broader solution to maintaining prime reliability beyond simply switching the control to a redundant FMV EHSV may be needed.

In such a situation a manifold select system may be desirable for such a redundant fuel metering system that performs the selection and isolation of the fuel supply to the primary and secondary fuel manifolds to overcome such a broader failure. Indeed, in the event of a failure leading to the loss of metered flow to the primary engine manifold, what is needed is to supply the primary engine manifold with a secondary metered flow source while shutting off the fuel flow supply path to a secondary manifold that was previously supplied from that source. In that way, the source for and control of the secondary manifold metering system may continue to be used to supply metered flow to the primary engine manifold. Such a solution is needed for both fuel control systems such as described in the '658 Patent as well as those described in the '508 application, i.e., regardless of other redundant control architectures involving the EHSVs.

Such switching of a metered fuel supply to maintain prime reliability of the main engine manifold may be accomplished by the addition of a switching valve 300 controlled by a transfer EHSV 302, such as illustrated in FIGS. 3 and 4. Specifically, during normal operation, the switching valve 300 is positioned as shown in FIG. 3 such that the metered fuel supply from the main fuel metering system 101 is supplied to the main engine manifold, and such that the metered fuel supply from the secondary fuel metering system 111 is supplied to the secondary engine manifold.

In the case of a failure of the main fuel metering system 101, the transfer EHSV 302 is commanded to position the switching valve 300 as illustrated in FIG. 4. In this transfer position, the metered fuel supply to the main engine manifold is transferred from the failed main fuel metering system 101 to the secondary fuel metering system 111. The metered fuel supply to the secondary manifold is disabled in this transfer position to ensure prime reliability and metered fuel flow control of the main engine manifold.

Unfortunately, utilizing such a switching valve 300 controlled by a transfer EHSV 302 as illustrated in FIGS. 3 and 4 to supply the primary engine manifold with a secondary metered flow source while shutting off the fuel flow supply path to a secondary manifold requires such a switching valve 300 to be sized to pass the total primary manifold fuel flow and the secondary manifold fuel flow with relatively low pressure loss during normal operation (FIG. 3). The size of such a switching valve to meet these requirements in certain fuel control systems is prohibitive. Further, such a switching valve 300 needs to ensure full isolation of the primary and secondary manifolds to prevent any metered flow errors or shutoff leakage to the secondary manifold. This additional requirement also drives weight and size of the switching valve 300.

In view of the above, embodiments of the present invention provide an improved manifold select system that does not suffer from the above identified and other problems that exist with the use of a switching valve. These and other advantages of the invention, as well as additional inventive features, will be apparent from the description of the embodiments of the invention provided herein.

BRIEF SUMMARY OF THE INVENTION

In view of the above, embodiments of the present invention provide systems and methods of ensuring prime reliability of a primary fuel manifold upon failure of a primary fuel metering system. In certain embodiments this is accomplished by providing metered fuel from a secondary fuel metering system. In other embodiments, a manifold select system and method enables switching of the output of a fuel metering system to one of a number of fuel manifolds.

In certain embodiments of the present invention, the system utilizes a transfer electro-hydraulic servo valve (EHSV), a discharge select valve (DSV) coupled to the EHSV, and a pair of throttling valves positioned between secondary fuel metering system and the primary and secondary fuel manifolds. The DSV in such embodiment has a multi-land piston that switches a control pressure and a shutoff pressure between the pair of throttling valves to transfer the supply of metered fuel of the secondary fuel metering system from the secondary fuel manifold to the primary fuel manifold. The output pressurizing valve of a failed primary fuel metering system is also closed to isolate the failed primary fuel metering system from the primary fuel manifold.

In one embodiment of the present invention, in the event of a failure leading to the loss of metered flow to the primary engine manifold, the manifold select system operates to supply the primary engine manifold with a secondary metered flow source. In another embodiment of the present invention, a method of shutting off the fuel flow supply path to a secondary manifold and switching control of the secondary manifold metering system to supply metered flow to the primary engine manifold is provided.

In normal run mode of an embodiment of the present invention, metered fuel flow to the primary engine manifold is supplied by the primary metering system. An Overspeed and Shutoff Valve (OSSV) and a Discharge Select Valve (DSV) are maintained in their normal operating positions isolating the primary manifold and secondary metering system from each other through a closed backup mode throttling valve.

In such embodiment, a secondary FMV EHSV controls the secondary metering valve position based on the FADEC's commands. A head regulator senses the differential pressure across the main FMV metering ports and acts as a variable restriction in series with an orifice to vary the throttling valve control pressure (P5). The secondary throttling valve acts as a variable restriction in series with the FMV to maintain a nearly constant differential pressure across the FMV ports. With nearly constant differential pressure across the FMV ports, scheduling flow becomes a function of FMV position.

When the FMU is operating in backup mode, specifically in the event of a failure of the main primary pump or the primary metering system, the DSV transfer EHSV is switched to backup mode. High pressure flow from the DSV EHSV first slew the OSSV delivering high-pressure fuel to the backside of the main pressurizing and shutoff valve causing it to close rapidly. High pressure flow from OSSV then slews the DSV to the backup position. With the DSV in the backup position, the head regulator control pressure (P5) is switched from the secondary throttling valve to the backup mode throttling valve, and high pressure is supplied to close the secondary throttling valve. With the backup throttling valve active, secondary metered flow is allowed to pass through this valve as burn flow to the main combustor.

In other embodiments, the OSSV and DSV are combined into one valve. In further embodiments, the system utilizes pressurizing valves instead of throttling valves for a bypassing the secondary metering system to the main engine manifold. Additional or different secondary, i.e., tertiary, etc., fuel metering stages may be used to provide the prime reliability of the main engine combustor, and/or any of the metering stages of a higher reliability priority.

In an embodiment of the present invention, the manifold select metering system for supplying metered fuel from a fuel metering system to one of a first fuel manifold or a second fuel manifold includes a transfer electro-hydraulic servo valve (EHSV), a discharge select valve (DSV) operatively coupled to the EHSV, a first throttling valve positioned between the fuel metering system and the first manifold, and a second throttling valve positioned between the fuel metering system and the second manifold. The DSV has a multi-land piston that is configured to switch a throttling valve control pressure from the second throttling valve to the first throttling valve, and to switch a throttling valve shutoff pressure from the first throttling valve to the second throttling valve.

In an embodiment, the metered fuel from the fuel metering system is supplied to the second fuel manifold when the transfer EHSV is commanded to a first state which positions the multi-land piston of the DSV to a quiescent position such that the throttling valve control pressure is connected to the second throttling valve and such that the throttling valve shutoff pressure is connected to the first throttling valve. Preferably, metered fuel from the fuel metering system is isolated from the first fuel manifold in such state.

In an embodiment, the metered fuel from the fuel metering system is supplied to the first fuel manifold when the transfer EHSV is commanded to a second state to slew the multi-land piston of the DSV to a commanded position such that the throttling valve control pressure is connected to the first throttling valve and such that the throttling valve shutoff pressure is connected to the second throttling valve. Preferably, the metered fuel from the fuel metering system is isolated from the second fuel manifold in such state.

In an embodiment, the system also includes an overspeed and shutoff valve (OSSV) that is fluidly coupled to the EHSV. Preferably, the OSSV includes a piston configured to connect transfer pressure to the DSV when commanded by the EHSV to drive the multi-land piston from a quiescent position to a commanded position to switch the throttling valve control pressure from the second throttling valve to the first throttling valve, and to switch the throttling valve shutoff pressure from the first throttling valve to the second throttling valve.

In an embodiment, the system also includes a pressurizing valve configured to supply metered fuel from a second fuel metering system to the first fuel manifold when the transfer EHSV is commanded to the first state. Preferably, metered fuel from the second fuel metering system is isolated from the first fuel manifold when the transfer EHSV is in the first state whereby the multi-land piston of the DSV is in the commanded position such that the throttling valve shutoff pressure is connected to the pressuring valve. Still more preferably, this embodiment includes an overspeed and shutoff valve (OSSV) fluidly coupled to the EHSV, wherein the OSSV includes a piston configured to connect transfer pressure to the DSV and to the pressurizing valve when commanded by the EHSV to drive the multi-land piston from a quiescent position to a commanded position. In one embodiment, a restriction is provided between the OSSV and the DSV such that the transfer pressure first closes the pressuring valve before slewing the multi-land piston from the quiescent position to the commanded position.

In another embodiment, a manifold select metering system for switching a supply of metered fuel from a secondary fuel metering system to a primary fuel manifold from a secondary fuel manifold upon failure of a primary fuel metering system supplying the primary fuel manifold includes a transfer electro-hydraulic servo valve (EHSV), an overspeed and shutoff valve (OSSV) fluidly coupled to the EHSV, a discharge select valve (DSV) operatively coupled to the OSSV, a pressurizing valve configured to supply metered fuel from the primary fuel metering system to the primary fuel manifold, a first throttling valve positioned between the secondary fuel metering system and the primary fuel manifold, and a second throttling valve positioned between the secondary fuel metering system and the secondary fuel manifold. The OSSV includes a piston configured to connect a transfer pressure to the pressurizing valve when commanded by the EHSV to isolate the primary fuel metering system from the primary fuel manifold. This piston is further configured to connect the transfer pressure to the DSV when commanded by the EHSV to drive a multi-land piston of the DSV from a quiescent position to a commanded position to switch a throttling valve control pressure from the second throttling valve to the first throttling valve, and to switch a throttling valve shutoff pressure from the first throttling valve to the second throttling valve.

In an embodiment, the system also includes a restriction between the OSSV and the DSV such that the transfer pressure first closes the pressuring valve before slewing the multi-land piston from the quiescent position to the commanded position.

In an embodiment, metered fuel from the secondary fuel metering system is supplied to the secondary fuel manifold when the transfer EHSV is commanded to a first state whereby the multi-land piston of the DSV is in the quiescent position such that the throttling valve control pressure is connected to the second throttling valve and such that the throttling valve shutoff pressure is connected to the first throttling valve. Preferably, the metered fuel from the secondary fuel metering system is isolated from the first fuel manifold when the transfer EHSV is in the first state.

In an embodiment, the metered fuel from the secondary fuel metering system is supplied to the primary fuel manifold when the transfer EHSV is commanded to a second state whereby the multi-land piston of the DSV is in a commanded position such that the throttling valve control pressure is connected to the first throttling valve and such that the throttling valve shutoff pressure is connected to the second throttling valve. Preferably, the metered fuel from the secondary fuel metering system is isolated from the secondary fuel manifold when the transfer EHSV is in the second state. In another embodiment, the throttling valve control pressure is provided by a secondary head regulator of the secondary fuel metering system as a differential pressure across a fuel metering valve's (FMV) metering ports of the secondary fuel metering system.

In an embodiment of the present invention, a method of providing prime reliability of a primary fuel manifold upon failure of a primary fuel metering system supplying metered fuel thereto is provided. The method includes the steps of isolating the primary fuel metering system from the primary fuel manifold, isolating a secondary fuel metering system from a secondary fuel manifold, and connecting the secondary fuel metering system to the primary fuel manifold.

In an embodiment, the step of isolating the primary fuel metering system from the primary fuel manifold includes the step of closing a pressurizing valve fluidly coupling the primary fuel metering system to the primary fuel manifold. Preferably, the step of isolating a secondary fuel metering system from a secondary fuel manifold includes the step of closing a first throttling valve fluidly coupling the secondary fuel metering system to the secondary fuel manifold. Still more preferably, the step of connecting the secondary fuel metering system to the primary fuel manifold includes the steps of switching a throttling valve shutoff pressure from a second throttling valve fluidly coupling the secondary fuel metering system to the primary fuel manifold to the first throttling valve, and switching a throttling valve control pressure from the first throttling valve to the second throttling valve.

In an embodiment the method also includes the step of commanding a transfer electro-hydraulic servo valve (EHSV) to slew a piston of an overspeed and shutoff valve (OSSV) fluidly coupled to the EHSV to connect a transfer pressure to the pressurizing valve to close the pressurizing valve to isolate the primary fuel metering system from the primary fuel manifold, to connect the transfer pressure to a discharge select valve (DSV) to drive a multi-land piston of the DSV from a quiescent position to a commanded position to switch the throttling valve control pressure from the first throttling valve to the second throttling valve, and to switch the throttling valve shutoff pressure from the second throttling valve to the first throttling valve.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning again to the drawings, and specifically with reference to FIGS. 5-10, there are illustrated embodiments of the manifold select fuel metering system of the present invention. As is apparent from the foregoing and as will be further discussed in the following, the various embodiments of the manifold select system and method of the present invention find particular applicability to multi-stage combustors, e.g., multi-stage turbine engines for use on aircraft. However, as will be recognized by those skilled in the art from the following description, application of the manifold select system described herein to such operating environments is provided by way of example and not by way of limitation. Indeed, the various inventive features of the present invention may find applicability outside of the aerospace industry, e.g. industrial multi-stage turbines or multiple turbine power generation systems requiring prioritized reliability of certain stages or combustors.

Figure 1:
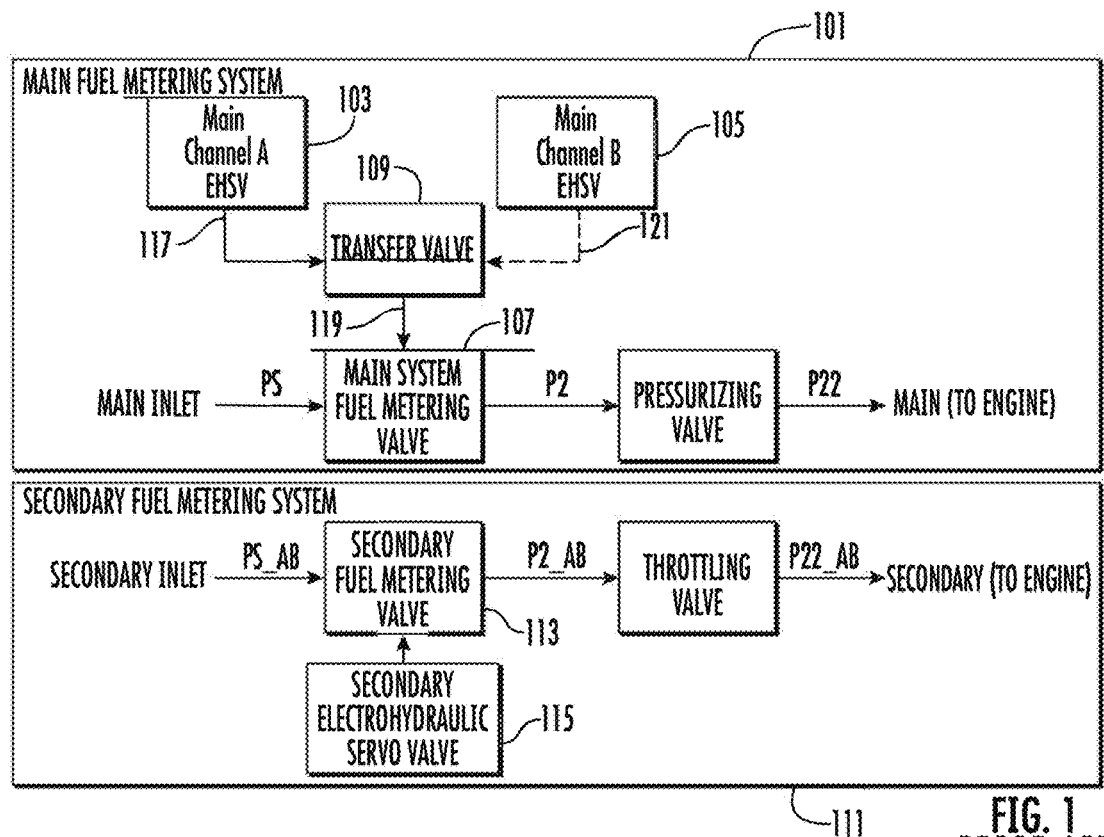
FIG. 1 is a simplified block diagram of a prior art fuel metering system for a multi-stage combustor having redundant fuel metering control for the primary stage combustor illustrating normal, non-fault operation.
Figure 2:
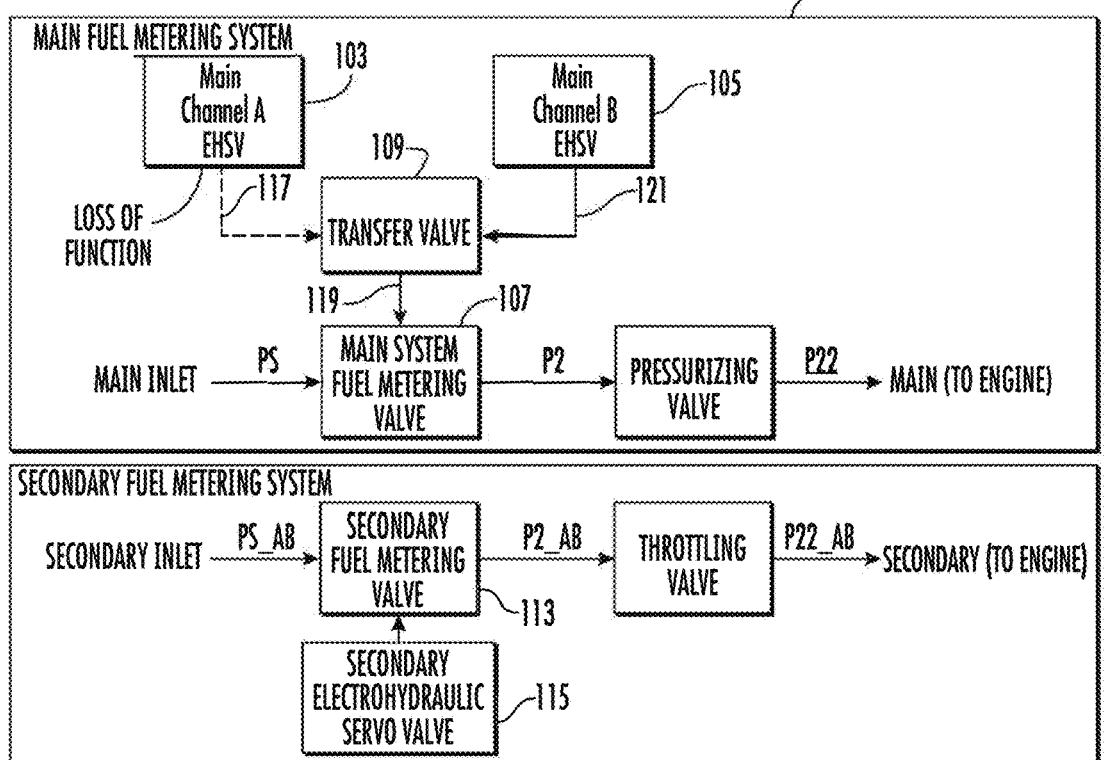
FIG. 2 is a simplified block diagram of the prior art fuel metering system for the multi-stage combustor having redundant fuel metering control for the primary stage combustor of FIG. 1 illustrating redundant fuel metering operation of the primary stage combustor during a failure of the primary FMV control.
Figure 3:
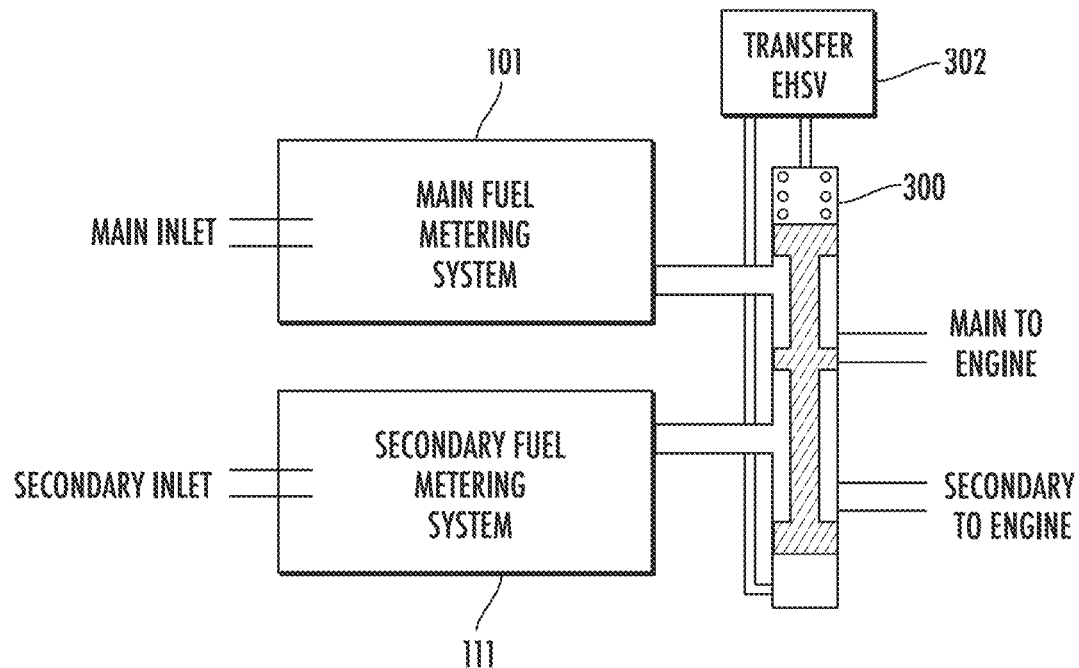
FIG. 3 is a simplified block diagram of a fuel metering switching system for a multi-stage combustor having redundant fuel metering switching for the primary stage combustor illustrating normal, non-fault operation.
Figure 4:
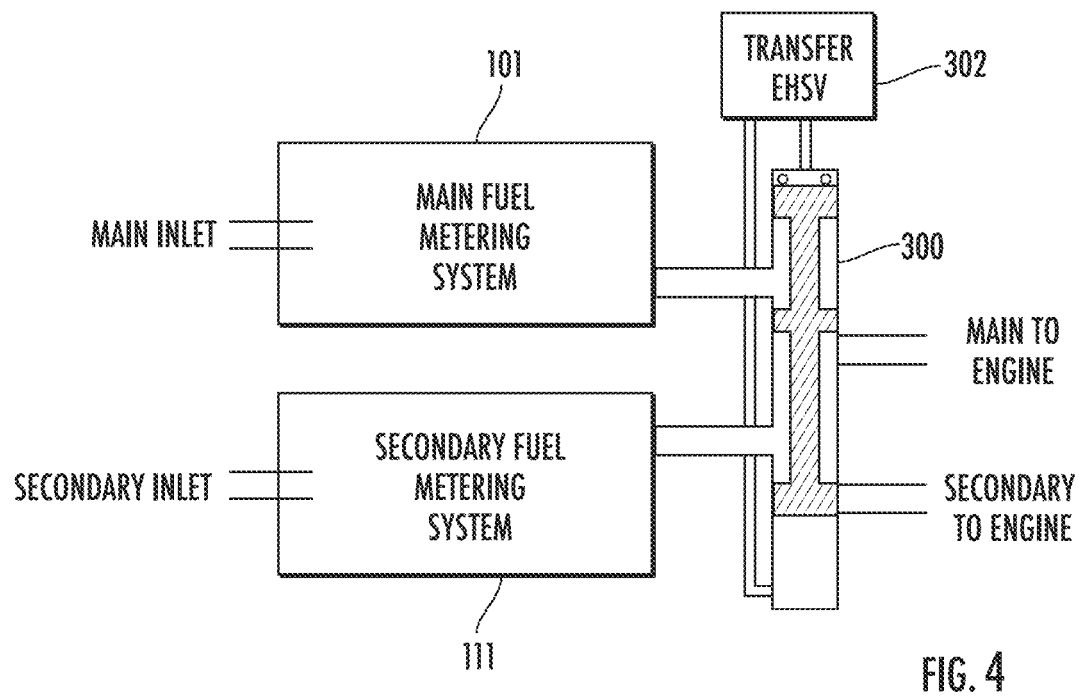
FIG. 4 is a simplified block diagram of the fuel metering switching system for the multi-stage combustor having redundant fuel metering switching for the primary stage combustor of FIG. 3 illustrating redundant fuel metering operation of the primary stage combustor during a failure of the primary fuel metering system.
Figure 5:
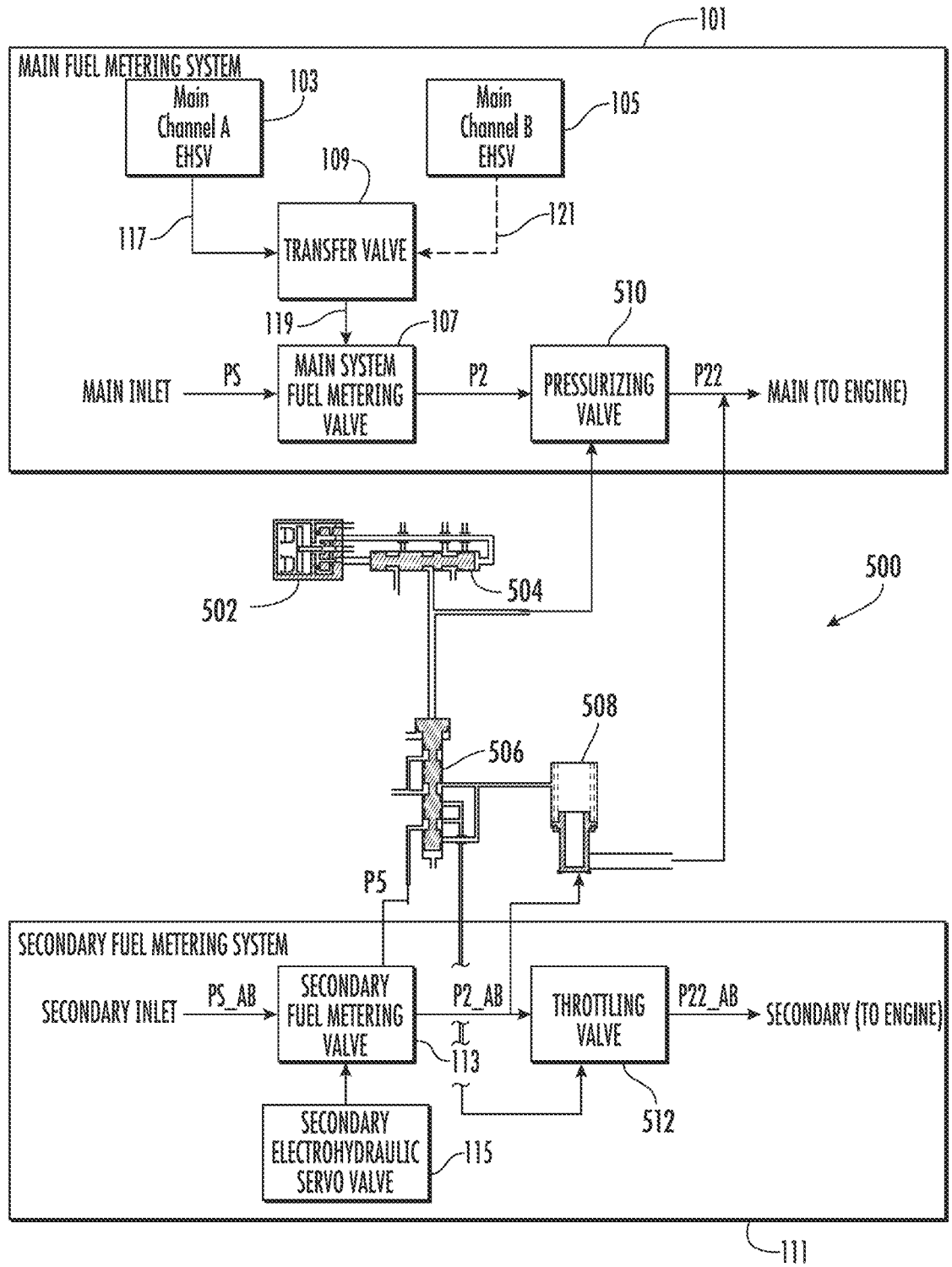
FIG. 5 is a simplified block and partial schematic diagram of an embodiment of a manifold select fuel metering system for a multi-stage combustor having redundant fuel metering control for the primary stage combustor illustrating normal, non-fault operation.

With reference to FIG. 5, there is illustrated a manifold select system 500 that provides an additional level of prime reliability to the main engine manifold supplied by the main fuel metering system 101, such as that described above with regard to FIG. 1. However, it should be noted that while the main fuel metering system 101 utilizes redundant EHSV 103, 105 control of the main system fuel metering valve (FMV) 107 as discussed above, redundant main system fuel metering valve control may also be provided in accordance with that described in the '508 application, also discussed above. However, because the manifold select system 500 provides a level of redundancy to maintain prime reliability of the main combustion zone, there need not be back up EHSVs in certain applications that do not require that level of additional redundancy to the main combustor.

As illustrated in the implementation shown in FIG. 5, under normal operating conditions, regardless of whether the main channel A EHSV 103 or the main channel B EHSV 105 is controlling the main system fuel metering valve 107, fuel is provided to the main engine under normal control of the main fuel metering system 101. Fuel is also provided to the secondary combustion zone of the engine under complete control of the secondary fuel metering system 111. In this mode the discharge select valve (DSV) 506 is positioned to maintain the backup mode throttling valve 508 in the closed position, thereby isolating the main fuel metering system 101 from the secondary fuel metering system 111.

In the event of a failure of the main primary fuel pump or other components resulting in a failure of the main fuel metering system 101, the manifold select system 500 operates to supply the metered fuel from the secondary fuel metering system 111 to the main engine manifold to maintain the prime reliability required for the main combustion zone.

Figure 6:
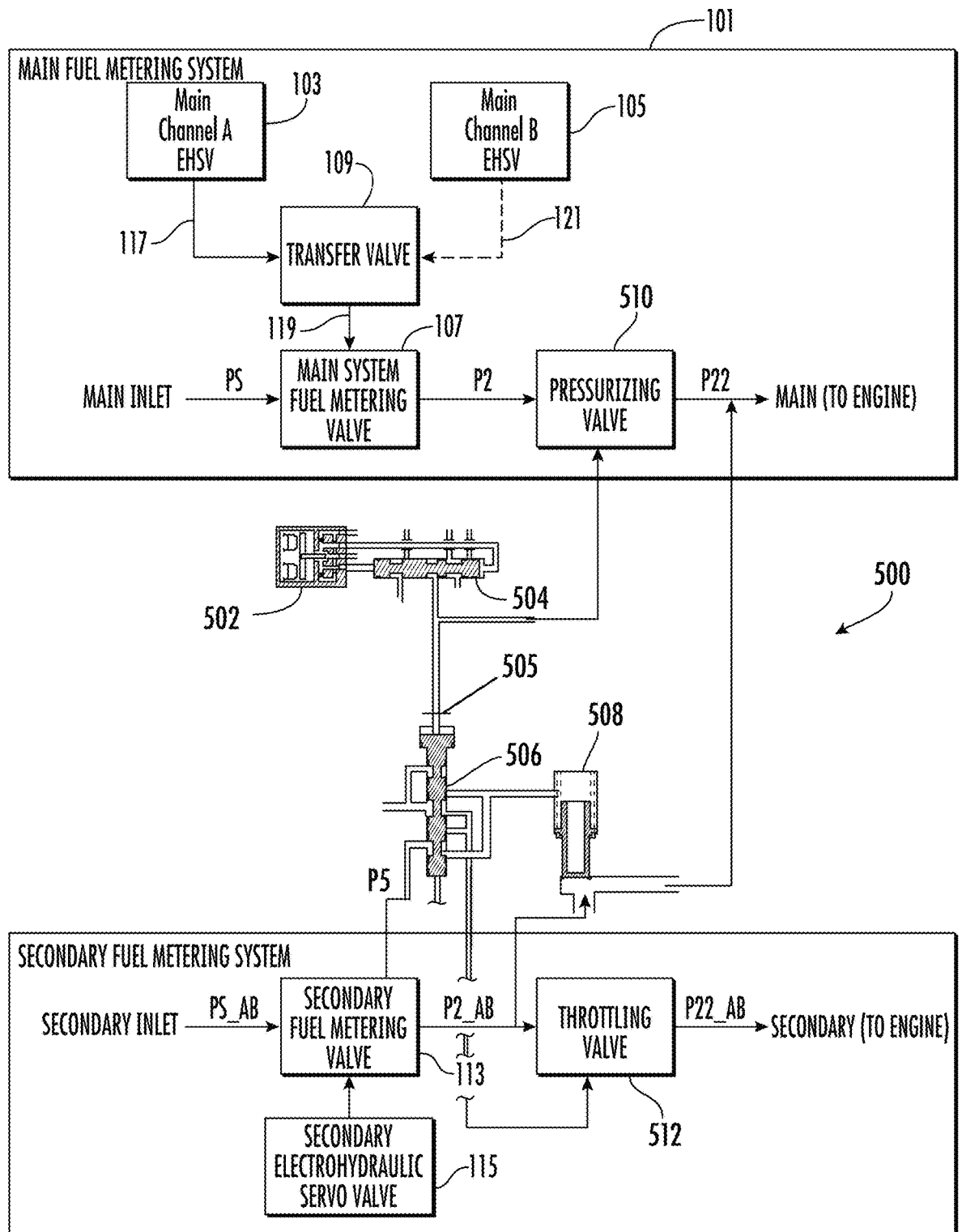
FIG. 6 is a simplified block and partial schematic diagram of the manifold select fuel metering system for the multi-stage combustor having redundant fuel metering control for the primary stage combustor of FIG. 5 illustrating redundant fuel metering operation of the primary stage combustor during a failure of the primary fuel metering system.

As illustrated in FIG. 6, the FADEC (not shown) commands the discharge select valve transfer EHSV 502 to the backup mode. High pressure then flows from the DSV transfer EHSV 502 to first slew the OSSV 504 to deliver high-pressure fuel to the backside of the main pressurizing valve 510, causing it to close rapidly to isolate the components of the main fuel metering system 101 from the main engine manifold. This high-pressure flow from the OSSV 504 is also connected through a restriction 505 to the DSV 506 to slew it to the backup position shown in FIG. 6.

With the DSV 506 in the backup position, the head regulator control pressure (P5) is switched from the secondary throttling valve 512 to the backup mode throttling valve 508 to enable control thereof. Also, with the DSV 506 in the backup position, high pressure is supplied to the secondary fuel metering system throttling valve 512 to close it and isolate the secondary fuel metering system 111 from the secondary engine manifold.

With the backup mode throttling valve 508 active, secondary metered flow from the secondary fuel metering system 111 is allowed to pass through this valve 508 as burn flow to the main combustor. In other words, the multi-land piston of the DSV 506 results in a reversal of the control pressure P5 from the secondary fuel metering system throttling valve 512 to the backup mode throttling valve 508 to enable metered control thereof, and reverses the application of the high pressure from the backup mode throttling valve 508 to the secondary fuel metering system throttling valve 512 to close it and isolate the secondary fuel metering system 111 from the secondary engine manifold. Such operation then provides a reliable fuel metering to the main engine combustor as controlled by the secondary fuel metering system 111.

Figure 7:
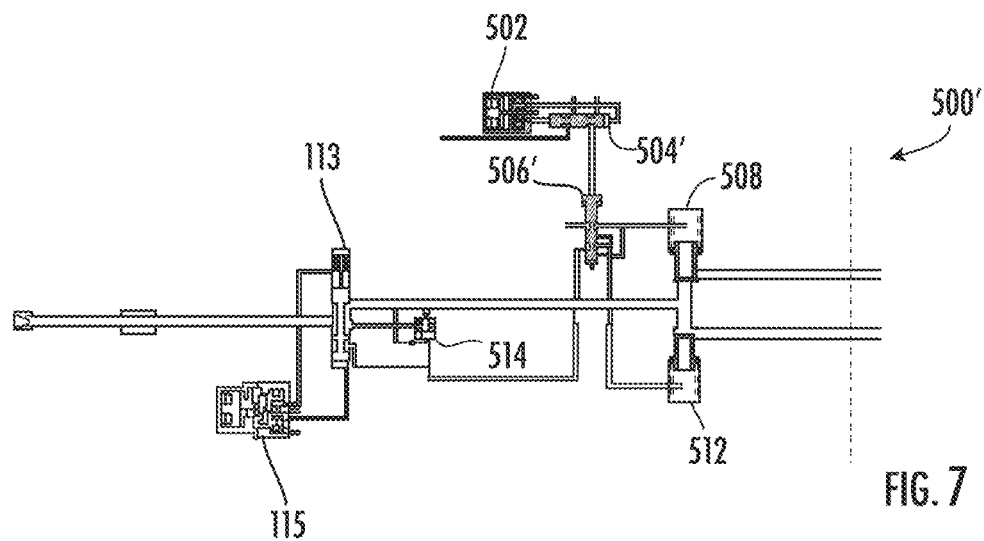
FIG. 7 is a simplified schematic diagram illustrating an embodiment of the manifold select system of the present invention illustrating selection of a first manifold.

Such manifold select operation may be better understood with reference to FIG. 7, which illustrates the normal operating mode of embodiment of a manifold select system 500' wherein supply of metered fuel is provided to a first manifold (the secondary engine manifold in the operating environment discussed above).

As illustrated, control of the secondary metering valve 113 is accomplished via the secondary EHSV 115. The head regulator 514 senses the differential pressure across the FMV 113 metering ports and acts as a variable restriction in series with an orifice to vary the throttling valve control pressure P5 to the throttling valve 512 via the DSV 506'. The secondary throttling valve 512 acts as a variable restriction in series with the FMV 113 to maintain a nearly constant differential pressure across the FMV 113 ports. With nearly constant differential pressure across the FMV 113 ports, scheduling flow becomes a function of the FMV 113 position.

The supply of fuel to the second manifold (the main engine manifold in the operating environment discussed above) is prevented by the closed backup mode throttling valve 508. This backup mode throttling valve 508 is held in the closed position by application of high pressure to its control chamber via the DSV 506'. The position of this DSV 506' is controlled by the OSSV 504', which is positioned by the transfer EHSV 502 under control of the FADEC.

Figure 8:
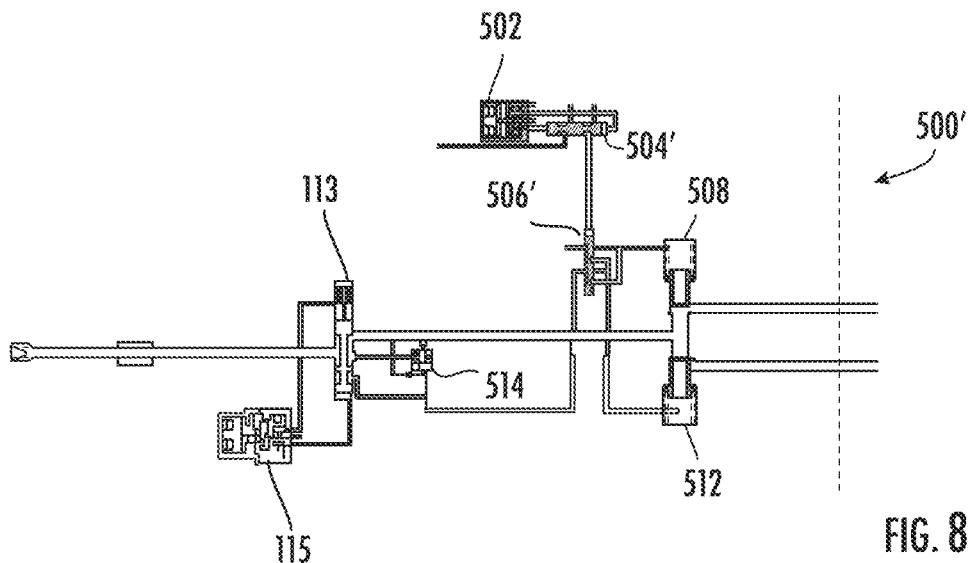
FIG. 8 is a simplified schematic diagram illustrating the embodiment of the manifold select system of the present invention shown in FIG. 7 illustrating selection of a second manifold.

If fuel is desired to be supplied to the second manifold (the main engine manifold in the operating environment discussed above), then the transfer EHSV 502 is commanded to transition the OSSV 504' to supply high pressure to the control chamber of the DSV 506', thereby transitioning its control land to the position shown in FIG. 8. In such position, the DSV 506' now channels the control pressure P5 to the backup mode throttling valve 508 to provide the controlled metered flow to the second manifold. In this position, the DSV 506' also switches the high pressure to the control chamber of the throttling valve 512 to force it closed, thereby isolating the first manifold from any further metered fuel flow.

As may now be apparent, metered flow may be switched between different manifolds by operation of the manifold select system 500' based upon a selection control signal to the transfer EHSV 502. Such a manifold select system 500' allows selectable control of metered flow to different manifolds as desired.

Figure 9:
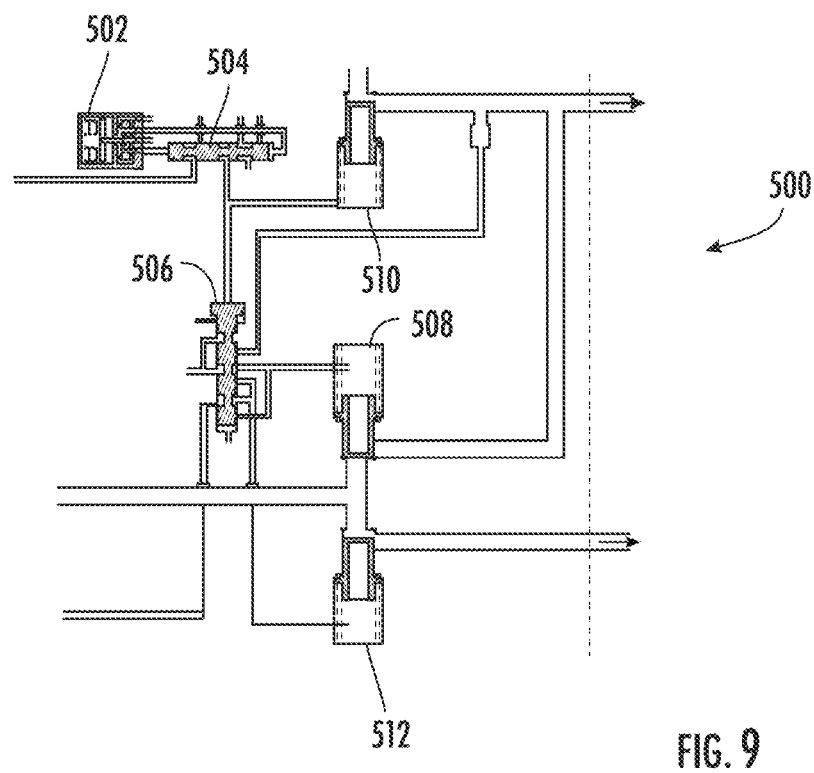
FIG. 9 is a simplified schematic diagram illustrating an embodiment of the manifold select fuel metering system of the present invention illustrating manifold selection during normal fuel metering control.

FIG. 9 illustrates additional details of the manifold select system 500 when implemented in a system utilizing a primary metering system having a pressurizing and shut off valve 510 to supply flow to the main manifold and a secondary throttling valve 512 to supply flow to a secondary manifold. When it is desired to supply metered flow to the main manifold from the metering system previously supplying flow to the secondary manifold, the transfer EHSV 502 commands the OSSV 504 to switch the high pressure to the pressurizing and shut off valve 510 and the DSV 506 as discussed previously.

Figure 10:
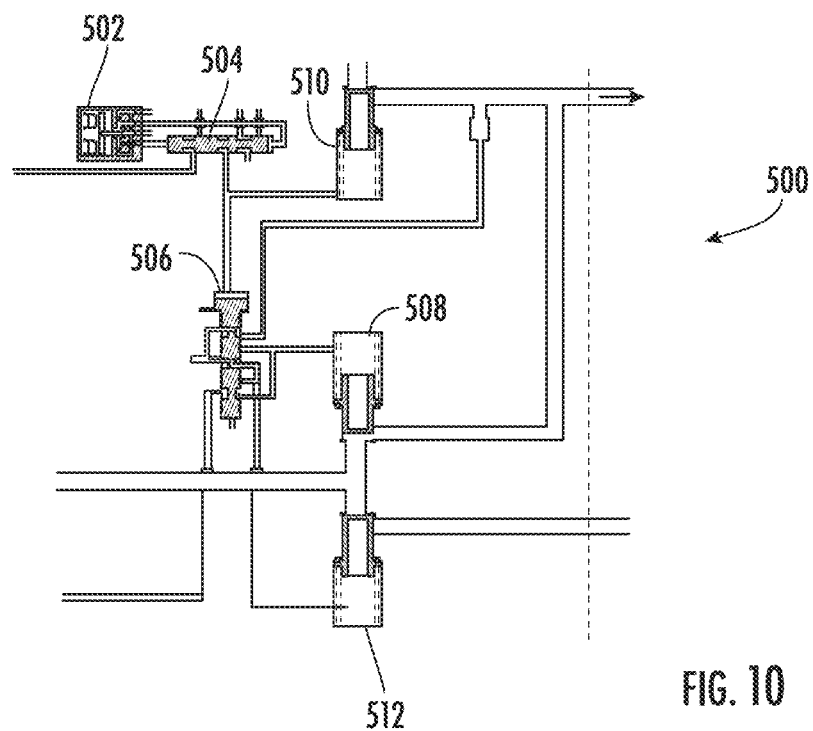
FIG. 10 is a simplified schematic diagram illustrating the embodiment of the manifold select fuel metering system of the present invention shown in FIG. 9 illustrating manifold selection during a failure in the primary fuel metering system.

Application of the high-pressure to the pressurizing and shut off valve 510 will cause it to close, thereby isolating the supply of flow to the main manifold from the main metering system. Such application of high pressure will also cause the DSV 506 to transition such that the high pressure is supplied to the secondary throttling valve 512 to cause it to close isolating the secondary manifold from the secondary metering system. The slewing of the DSV 506 also transitions the control pressure P5 from the secondary head regulator to the backup mode throttling valve 508 to allow the flow to be provided to the main manifold as illustrated in FIG. 10.

As will now be apparent from the foregoing description, other embodiments of the present invention may utilize a single selection valve that combines the operation of the OSSV 504 and the DSV 506. Such a single combined valve would simply supply high pressure to the pressurizing and shut off valve 510 and the secondary throttling valve 512, and would switch the secondary head regulator control pressure P5 from the secondary throttling valve 512 to the backup mode throttling valve 508 upon slewing of its piston.

Further, those skilled in the art will recognize that other embodiments of the manifold select system 500 of the present invention could utilize a pressurizing valve instead of a throttling valve for bypassing the secondary metered flow to the primary manifold. Indeed, other embodiments of the manifold select system 500 may utilize additional secondary metering systems the flow from which can be applied to different manifolds in order to maintain a prioritized priority system of supply to such different manifolds, or simply a different routing of such metered supply flow as desired.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A manifold select metering system for supplying metered fuel from a fuel metering system to one of a first fuel manifold or a second fuel manifold, comprising:
   a transfer electro-hydraulic servo valve (EHSV);
   a discharge select valve (DSV) operatively coupled to the transfer EHSV;
   a first throttling valve positioned between the fuel metering system and the first manifold;
   a second throttling valve positioned between the fuel metering system and the second manifold; and
   wherein the DSV has a multi-land piston configured to switch a throttling valve control pressure from the second throttling valve to the first throttling valve, and to switch a throttling valve shutoff pressure from the first throttling valve to the second throttling valve.

2. The manifold select metering system of claim 1, wherein metered fuel from the fuel metering system is supplied to the second fuel manifold when the transfer EHSV is commanded to a first state whereby the multi-land piston of the DSV is in a quiescent position such that the throttling valve control pressure is connected to the second throttling valve and such that the throttling valve shutoff pressure is connected to the first throttling valve.

3. The manifold select metering system of claim 2, wherein the metered fuel from the fuel metering system is isolated from the first fuel manifold when the transfer EHSV is in the first state.

4. The manifold select metering system of claim 2, further comprising a pressurizing valve configured to supply metered fuel from a second fuel metering system to the first fuel manifold when the transfer EHSV is in the first state.

5. The manifold select metering system of claim 4, wherein the metered fuel from the second fuel metering system is isolated from the first fuel manifold when the transfer EHSV is commanded to a second state whereby the multi-land piston of the DSV is in a commanded position such that the throttling valve shutoff pressure is connected to the pressurizing valve.

6. The manifold select metering system of claim 5, further comprising an overspeed and shutoff valve (OSSV) fluidly coupled to the transfer EHSV, wherein the OSSV includes a piston configured to connect transfer pressure to the DSV and to the pressurizing valve when commanded by the transfer EHSV to drive the multi-land piston from a quiescent position to the commanded position.

7. The manifold select metering system of claim 5, further comprising a restriction between the OSSV and the DSV such that a transfer pressure first closes the pressurizing valve before slewing the multi-land piston from the quiescent position to the commanded position.

8. The manifold select metering system of claim 1, wherein metered fuel from the fuel metering system is supplied to the first fuel manifold when the transfer EHSV is commanded to a second state whereby the multi-land piston of the DSV is in a commanded position such that the throttling valve control pressure is connected to the first throttling valve and such that the throttling valve shutoff pressure is connected to the second throttling valve.

9. The manifold select metering system of claim 8, wherein the metered fuel from the fuel metering system is isolated from the second fuel manifold when the transfer EHSV is in the second state.

10. The manifold select metering system of claim 1, further comprising an overspeed and shutoff valve (OSSV) fluidly coupled to the EHSV, wherein the OSSV includes a piston configured to connect transfer pressure to the DSV when commanded by the EHSV to drive the multi-land piston from a quiescent position to a commanded position to switch the throttling valve control pressure from the second throttling valve to the first throttling valve, and to switch the throttling valve shutoff pressure from the first throttling valve to the second throttling valve.

11. A manifold select metering system for switching a supply of metered fuel from a secondary fuel metering system to a primary fuel manifold from a secondary fuel manifold upon failure of a primary fuel metering system supplying the primary fuel manifold, comprising:
   a transfer electro-hydraulic servo valve (EHSV);
   an overspeed and shutoff valve (OSSV) fluidly coupled to the transfer EHSV;
   a discharge select valve (DSV) operatively coupled to the OSSV;
   a pressurizing valve configured to supply metered fuel from the primary fuel metering system to the primary fuel manifold;
   a first throttling valve positioned between the secondary fuel metering system and the primary fuel manifold;
   a second throttling valve positioned between the secondary fuel metering system and the secondary fuel manifold; and
   wherein the OSSV includes a piston configured to connect a transfer pressure to the pressurizing valve when commanded by the transfer EHSV to isolate the primary fuel metering system from the primary fuel manifold;
   wherein the piston is further configured to connect the transfer pressure to the DSV when commanded by the transfer EHSV to drive a multi-land piston of the DSV from a quiescent position to a commanded position to switch a throttling valve control pressure from the second throttling valve to the first throttling valve, and to switch a throttling valve shutoff pressure from the first throttling valve to the second throttling valve.

12. The manifold select metering system of claim 11, further comprising a restriction between the OSSV and the DSV such that the transfer pressure first closes the pressurizing valve before slewing the multi-land piston from the quiescent position to the commanded position.

13. The manifold select metering system of claim 11, wherein the metered fuel from the secondary fuel metering system is supplied to the secondary fuel manifold when the transfer EHSV is commanded to a first state whereby the multi-land piston of the DSV is in the quiescent position such that the throttling valve control pressure is connected to the second throttling valve and such that the throttling valve shutoff pressure is connected to the first throttling valve.

14. The manifold select metering system of claim 13, wherein the metered fuel from the secondary fuel metering system is isolated from the first fuel manifold when the transfer EHSV is in the first state.

15. The manifold select metering system of claim 11, wherein the metered fuel from the secondary fuel metering system is supplied to the primary fuel manifold when the transfer EHSV is commanded to a second state whereby the multi-land piston of the DSV is in a commanded position such that the throttling valve control pressure is connected to the first throttling valve and such that the throttling valve shutoff pressure is connected to the second throttling valve.

16. The manifold select metering system of claim 15, wherein the metered fuel from the secondary fuel metering system is isolated from the secondary fuel manifold when the transfer EHSV is in the second state.

17. The manifold select metering system of claim 11, wherein the throttling valve control pressure is provided by a secondary head regulator of the secondary fuel metering system as a differential pressure across a fuel metering valve (FMV) metering ports of the secondary fuel metering system.

18. A method of providing prime reliability of a primary fuel manifold upon failure of a primary fuel metering system supplying metered fuel thereto, the method comprising the steps of:
isolating the primary fuel metering system from the primary fuel manifold;
isolating a secondary fuel metering system from a secondary fuel manifold; and
connecting the secondary fuel metering system to the primary fuel manifold;
wherein the step of isolating the primary fuel metering system from the primary fuel manifold comprises the step of closing a pressurizing valve fluidly coupling the primary fuel metering system to the primary fuel manifold,
wherein the step of isolating a secondary fuel metering system from a secondary fuel manifold comprises the step of closing a first throttling valve fluidly coupling the secondary fuel metering system to the secondary fuel manifold, and
wherein the step of connecting the secondary fuel metering system to the primary fuel manifold comprises the steps of:
switching a throttling valve shutoff pressure from a second throttling valve fluidly coupling the secondary fuel metering system to the primary fuel manifold to the first throttling valve; and
switching a throttling valve control pressure from the first throttling valve to the second throttling valve.

19. The method of claim 18, further comprising the step of commanding a transfer electro-hydraulic servo valve (EHSV) to slew a piston of an overspeed and shutoff valve (OSSV) fluidly coupled to the transfer EHSV to connect a transfer pressure to the pressurizing valve to close the pressurizing valve to isolate the primary fuel metering system from the primary fuel manifold, and to connect the transfer pressure to a discharge select valve (DSV) to drive a multi-land piston of the DSV from a quiescent position to a commanded position to switch the throttling valve control pressure from the first throttling valve to the second throttling valve, and to switch the throttling valve shutoff pressure from the second throttling valve to the first throttling valve.

\* \* \* \* \*